Figure 1:
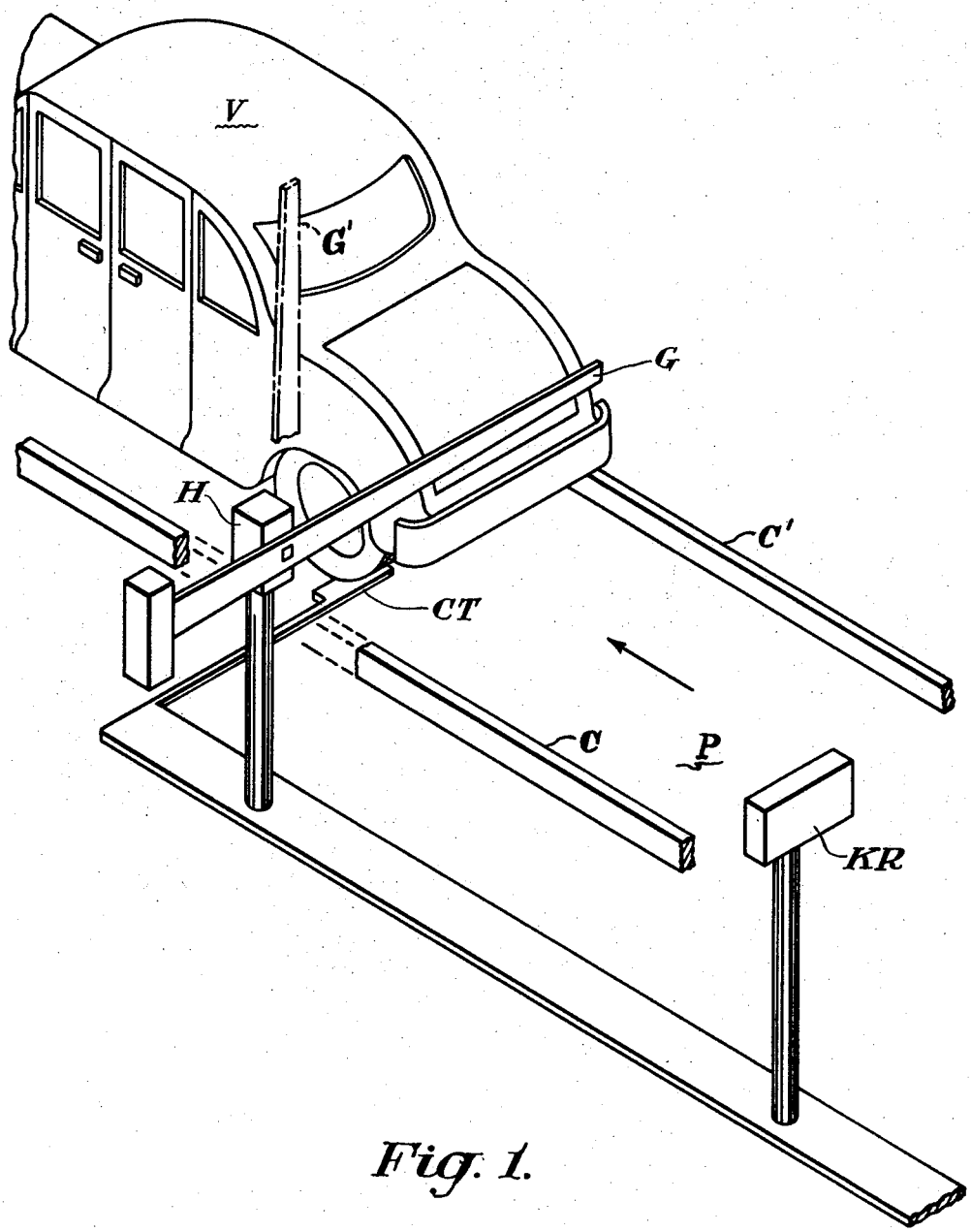

Sept. 29, 1964   C. E. STAPLES   3,150,454
BARRIER CONTROL SYSTEM
Filed March 20, 1961   2 Sheets-Sheet 1

INVENTOR.
Crawford E. Staples
BY
W. L. Stout
HIS ATTORNEY

United States Patent Office 3,150,454
Patented Sept. 29, 1964

3,150,454
BARRIER CONTROL SYSTEM
Crawford E. Staples, Edgewood, Pa., assignor to Westinghouse Air Brake Company, Wilmerding, Pa., a corporation of Pennsylvania
Filed Mar. 20, 1961, Ser. No. 96,942
9 Claims. (Cl. 39—1)

My invention relates to a barrier control system. More specifically my invention relates to a system for automatically controlling the movements of a barrier between obstructing and nonobstructing positions in a passageway through which vehicles move in a single lane and in a single direction.

Numerous installations exist at which a toll for the passage of a vehicle is to be collected but where, for economic or other reasons, it is expedient that attendants are not required to collect the toll for such passage. For example, at the entrance to a toll highway or bridge it may be expedient to provide a barrier obstructing a single lane vehicle passageway leading to the entrance and to require the deposit of a coin or coins in a receptacle to control the barrier to a nonobstructing position to permit passage of a vehicle. However, in order to prevent the passage of more than a single vehicle upon the payment of a single toll, it is necessary that the barrier be again moved to its obstructing position as soon as practicable following the passage of the single vehicle for which the toll is paid. Furthermore, in order to prevent possible damage to vehicles, if the barrier is in its nonobstructing position or is in transit from its nonobstructing to its obstructing position due to the authorized passage of a first vehicle, the barrier should be maintained in the nonobstructing position or returned thereto immediately upon the payment of the required toll for a second vehicle closely following the first.

Another example of an installation where such a barrier control system may be useful is at the vehicle entrance to a restricted area to which only authorized vehicles are to be admitted. At such an entrance the barrier may be automatically controlled to a nonobstructing position by the insertion of a proper key in a controller, and returned to its obstructing position in the manner above described to prevent unauthorized vehicles from entering the restricted area.

Accordingly, it is one object of my invention to provide a vehicle barrier control system, such as that described, in which, insofar as possible, an unauthorized vehicle is prevented from passing the barrier.

It is a second object of my invention to provide such a system in which the possibility of damage to vehicles by the barrier is reduced to a minimum.

To accomplish the foregoing objects of my invention, I provide a barrier movable by reversible power means between traffic obstructing and nonobstructing positions in response to opening and closing controls, the closing control being actuated as soon as practicable after the passage of a vehicle past the barrier, and being interrupted, to prevent damage to vehicles, in the event of a second operation of the opening control prior to the completion of a movement of the barrier to its obstructing position.

Other objects and characteristic features of my invention will become apparent as the description proceeds.

In the accompanying drawings FIG. 1 is a perspective view of a vehicle passageway normally obstructed by a movable gate or barrier controlled by the apparatus of my invention.

Figure 2:
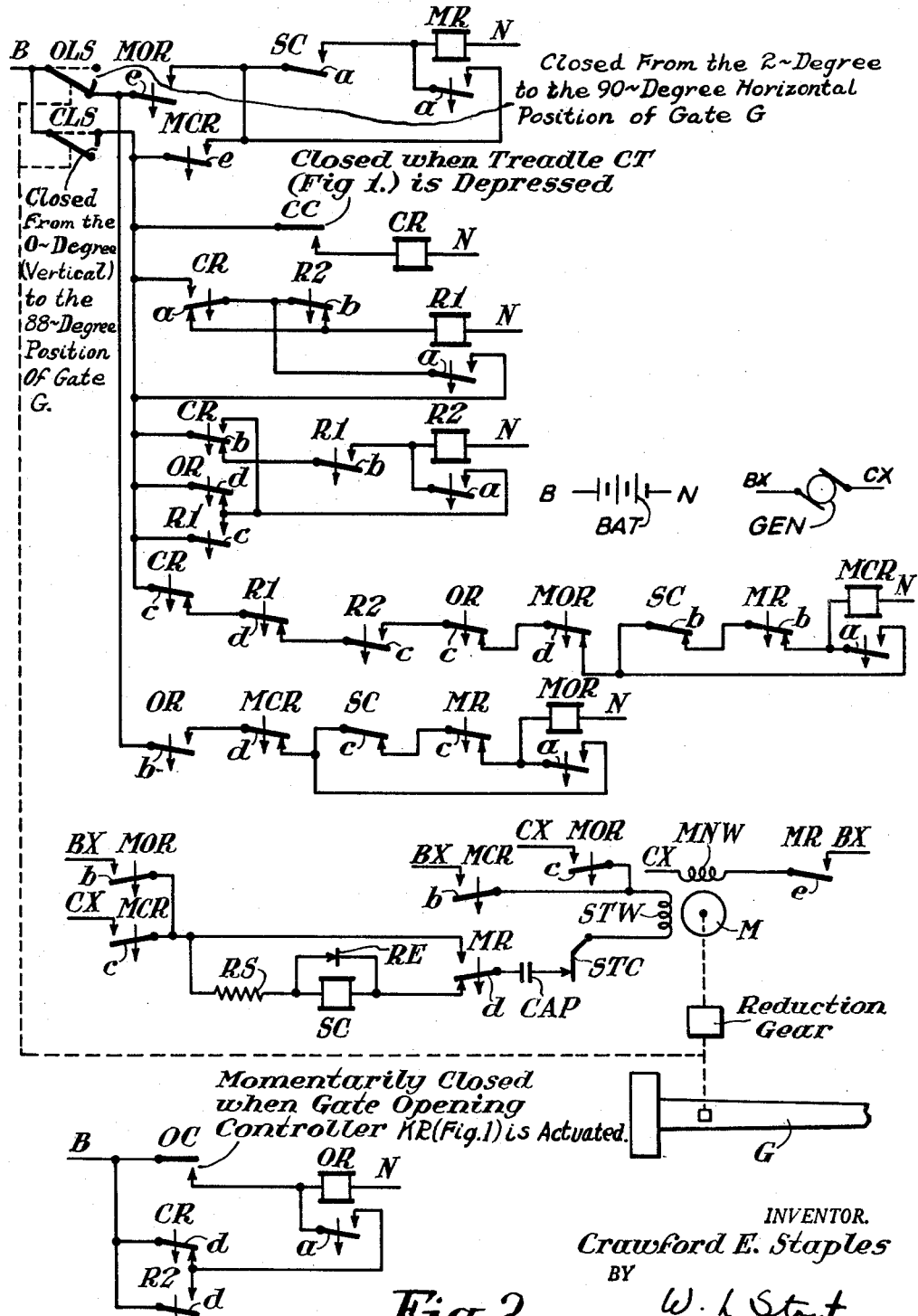

FIG. 2 is a schematic circuit diagram of the apparatus employed for control of the movements of the gate or barrier shown in FIG. 1 between obstructing and nonobstructing positions in accordance with my invention.

Similar reference characters refer to similar parts in both views.

Referring to FIG. 1, I have here shown a single lane, single direction vehicle passageway or roadway P formed by curbs or railings C and C' and through which vehicles move in the direction indicated by the arrow to a toll bridge, toll highway, parking lot, or some similar installation (not shown). A barrier, shown in the drawing as a gate G movable between a horizontal traffic obstructing position and a vertical nonobstructing traffic position is associated with the passageway or roadway to control the movement of vehicle traffic therethrough, the gate normally occupying its traffic obstructing position as shown in the drawing by solid lines. The nonobstructing traffic position of the gate is shown by the dotted outline of the gate in its vertical position and designated by the reference character G'.

The operation of the gate G to its nonobstructing traffic position G' may be initiated by a number of different control devices, such as by a coin or key receptacle KR shown in FIG. 1 at a location along the vehicle passageway readily accessible to the driver or operator of a vehicle approaching the gate. When such a receptacle is employed, the insertion of the proper coin or coins therein, or the insertion of the proper key, will actuate the control device and thereby initiate a control to operate the gate to its nonobstructing traffic position in a manner to be hereinafter described.

Treadle CT, as shown in FIG. 1, is located in the roadway a sufficient distance from the gate to insure that the rear end of a vehicle is beyond the gate when the treadle is depressed by a rear wheel of the vehicle. At the same time such treadle should be located as near the gate as possible in order that the gate can be controlled to its obstructing position at the earliest practicable time following the passage of a vehicle, thereby insuring insofar as possible, that a second closely following vehicle cannot pass the gate due to the gate remaining open for too long a time following the passage of the preceding vehicle. It is, therefore, apparent that the location of treadle CT in the roadway depends on the distance from the rear axles to the clearance point of the rear end of vehicles to be using the roadway and having the greatest such distance. Such location of treadle CT is illustrated in FIG. 1 of the drawings, the rear end of the vehicle V having cleared gate G when treadle CT is actuated by a rear wheel of the vehicle. By this arrangement, if vehicle V should stop with its rear wheel just beyond treadle CT, when gate G moves to its horizontal or closed position it will clear the rear end of the vehicle.

The motive power means for moving the gate between its obstructing and nonobstructing positions are housed in a suitable housing or case H (FIG. 1) and may comprise a suitable reduction gear and drive arrangement operatively connecting the gate to a reversible motor M as indicated schematically in FIG. 2 by the dotted line extending between the motor M and the reduction gear and gate G. Many such suitable drive and gear arrangements are known, and any such arrangement may be employed, the details thereof forming no part of my present invention. Motor M is shown in FIG. 2 as a reversible electric motor of the single phase induction type, having a starting winding STW and a main or running winding MNW, and provided with a starting contact STC which is closed when the motor rotor is at rest or running below a predetermined speed and is open when the speed of the rotor of the motor exceeds such speed. A suitable phase shifting device shown as a capacitor CAP is employed in the circuit to one side of the starting winding. Such motors are well known in the art and no detailed description thereof is necessary. The control circuits for motor M will be described in detail hereinafter.

There is controlled by the key or coin receptacle KR (FIG. 1) a contactor or circuit controller comprising a contact OC shown in FIG. 2 of the drawings. This contact is normally open and is momentarily actuated to its closed position by the insertion of the proper coin or coins into receptacle KR, or by the insertion and removal of a proper key into and from the receptacle if a key operated receptacle is employed. Such coin or key operated controllers are well known in the art and no detailed description thereof is necessary since the details thereof form no part of my present invention, the key or coin operated controller being shown merely as an example of one type of controller that can be employed for the initiation of an opening control for the barrier or gate G. Contact OC is legended in FIG. 2, "momentarily closed when gate opening controller KR (FIG. 1) is actuated."

Treadle CT (FIG. 1) when depressed by a wheel of a vehicle actuates a contactor or circuit controller comprising a contact CC shown in FIG. 2 of the drawings. This Contact is normally open and is actuated to its closed position by the depression of the treadle by a wheel of a vehicle. This contact is legended in FIG. 2 "closed when treadle CT (FIG. 1) is depressed."

Reference characters OLS and CLS (FIG. 2) designate contacts controlled respectively by an opening limit switch and a closing limit switch which, as indicated schematically by the dotted line extending between said contacts and gate G, are actuated by the movement of the gate to control the supply of power to the gate motor and to interrupt such supply when the gate nears its fully open position or its fully closed position, respectively, as will be hereinafter described. As shown in FIG. 2, contact OLS is closed when the gate is in its obstructing position and contact CLS is open at that time. When the gate moves a predetermined distance from its obstructing position, contact CLS closes and, when the gate nears its nonobstructing position, contact OLS opens. Similarly, when the gate moves a predetermined distance from its nonobstructing position, contact OLS closes and, when the gate nears its obstructing position, contact CLS opens. As a specific example of the operation of these contacts, it will be assumed that the horizontal or closed position of the gate is the 90-degree position and that the vertical or open position of the gate is the 0-degree position. As legended in FIG. 2, contact OLS may then be arranged to be closed between the 2-degree to the 90-degree positions of the gate and contact CLS may be arranged to be closed between the 0-degree to the 88-degree positions of the gate. However, as is believed apparent, the specific points in the movement of gate G at which contacts OLS and CLS are arranged to open and close depend on the inertia supplied to the gate by the motor M and the reduction gear means, and the 2-degree and 88-degree positions are set forth only for purposes of one operational example of such contacts. The operation of such limit switch contacts is well known and no further details thereof are considered necessary.

It is expedient to point out at this time that suitable sources of direct and alternating currents are shown in FIG. 2 for controlling the apparatus of my invention, the direct current power source being a battery of proper voltage and capacity and designated BAT, and the alternating current being supplied by a generator designated GEN. The positive and negative terminals of the direct current source are identified by reference characters B and N, respectively, and the terminals of the alternating current source are identified by reference characters BX and CX.

There is also shown in FIG. 2 of the drawings a plurality of relays designated MR, MOR, MCR, OR, CR, SC, R1 and R2. These relays are direct current relays of the neutral two-position type well known in the art and each is shown in the conventional manner by a geometric rectangle representing the winding of the relay. The contacts controlled by each relay are in most instances not shown below the rectangle representing the associated winding but in all such instances the reference character for each respective relay is disposed on the drawing above each contact of that relay. This will be readily apparent by referring to FIG. 2. The relays are all shown in their normally deenergized condition and, therefore, the front and back contacts of the relays are shown open and closed, respectively.

All of the relays shown in FIG. 2, except relay SC, are provided with a slow release feature which is indicated by arrows pointed in the downward direction and drawn down through the movable portion of each contact of each such slow release relay. The purpose of the slow release feature of such relays, and consequently their contacts, will be pointed out hereinafter.

Referring further to FIG. 2, relay OR is provided with a pickup circuit which extends from battery terminal B over contact OC of the gate opening controller, previously discussed, and through the winding of relay OR to battery terminal N. Relay OR is provided with a multiple stick circuit which extends from battery terminal B over back contact $d$ of relay CR and front contact $d$ of relay R2 in multiple, front contact $a$ of relay OR and through the winding of relay OR to battery terminal N. Relay OR thus becomes picked up whenever contact OC closes and, once picked up, is maintained in that position so long as relay CR remains released or relay R2 remains picked up.

Relay MOR has a pickup circuit which may be traced from terminal B of the battery over contact OLS of the opening limit switch, previously discussed, front contact $b$ of relay OR, back contact $d$ of relay MCR, back contact $c$ of relay SC, back contact $c$ of relay MR, and through the winding of relay MOR to battery terminal N. Relay MOR has a stick circuit extending from battery terminal B, through contact OLS of the opening limit switch, front contact $b$ of relay OR, back contact $d$ of relay MCR, front contact $a$ of relay MOR, and through the winding of relay MOR to battery terminal N. Thus, relay MOR becomes picked up whenever contact OLS is closed, relay OR becomes picked up, and relays MCR, SC and MR are all released. Once picked up relay MOR is maintained in that position so long as contact OLS remains closed, relay OR remains picked up and relay MCR remains released.

Relay R1 has a pickup circuit extending from terminal B of the battery over contact CLS of the closing limit switch, the front point of contact $a$ of relay CR, back contact $b$ of relay R2, and through the winding of relay R1 to battery terminal N. Relay R1 has a multiple stick circuit extending from terminal B of the battery over contact CLS, front contact $a$ of relay R1, back contact $b$ of relay R2 in multiple with the back point of contact $a$ of relay CR, and through the winding of relay R1 to battery terminal N. Relay R1 is thus picked up whenever contact CLS is closed, relay CR is picked up, and relay R2 is released. Once picked up, relay R1 is maintained picked up so long as contact CLS remains closed and relay R2 remains released, or so long as contact CLS remains closed and relay CR releases before relay R2 picks up and thereafter remains released.

Relay R2 is provided with a pickup circuit extending from battery terminal B, through contact CLS, the back point of contact *b* of relay CR, front contact *b* of relay R1, and through the winding of relay R2 to battery terminal N. Relay R2 is provided with a stick circuit which extends from battery terminal B over contact CLS, and over the front point of contact *b* of relay CR, back contact *d* of relay OR and front contact *c* of relay R1, all in multiple, and over front contact *a* of relay R2 and through the winding of relay R2 to battery terminal N. Thus relay R2 becomes picked up whenever contacts CLS is closed, relay CR is released and relay R1 is picked up. Once picked up relay R2 is maintained picked up so long as contact CLS remains closed and relay OR remains released, or so long as contact CLS remains closed and relay R1 remains picked up, or so long as contact CLS remains closed and relay CR picks up before relay R1 releases and thereafter remains picked up.

Relay CR has a pickup circuit extending from terminal B of the battery over contact CLS, contact CC of treadle CT, previously discussed, and through the winding of relay CR to battery terminal N. Relay CR is thus picked up whenever contacts CLS and CC are both closed.

Relay MCR has a pickup circuit extending from battery terminal B over contact CLS, back contact *c* of relay CR, back contact *d* of relay R1, front contact *c* of relay R2, back contact *c* of relay OR, back contact *d* of relay MOR, back contact *b* of relay SC, back contact *b* of relay MR, and through the winding of relay MCR to battery terminal N. Relay MCR is provided with a stick circuit extending from terminal B of the battery over contact CLS, back contact *c* of relay CR, back contact *d* of relay R1, front contact *c* of relay R2, back contact *c* of relay OR, back contact *d* of relay MOR, front contact *a* of relay MCR, and through the winding of relay MCR to battery terminal N. Relay MCR thus becomes picked up whenever contact CLS is closed, relays CR, R1, OR, MOR, SC and MR are all released, and relay R2 is picked up. Once so picked up relay MCR is maintained picked up so long as contact CLS remains closed, relays CR, R1, OR and MOR all remain released, and relay R2 remains picked up.

Relay MR is provided with a first pickup circuit which extends from battery terminal B over contact OLS, front contact *e* of relay MOR, front contact *a* of relay SC, and through the winding of relay MR to battery terminal N. Relay MR has a second pickup circuit extending from battery terminal B over contact CLS, front contact *e* of relay MCR, front contact *a* of relay SC, and through the winding of relay MR to battery terminal N. Relay MR has a first stick circuit extending from battery terminal B over contact OLS, front contact *e* of relay MOR, front contact *a* of relay MR and through the winding of relay MR to battery terminal N. Relay MR has a second stick circuit extending from battery terminal B over contact CLS, front contact *e* of relay MCR, front contact *a* of relay MR, and through the winding of relay MR to battery terminal N. Relay MR is therefore picked up whenever contact OLS is closed and relays MOR and SC are both picked up, or whenever contacts CLS is closed and relays MCR and SC are both picked up. Once picked up relay MR is maintained picked up so long as contact OLS remains closed and relay MOR remains picked up, or so long as contact CLS remains closed and relay MCR remains picked up.

As is well known, the rotor of single phase induction motors may be caused to rotate in a first (forward) direction or in a second (reverse) direction in accordance with the phase of the current supplied to the starting winding of the motor in relation to the phase of the current supplied to the main or running winding of the motor. If, then, alternating current of a particular phase is supplied to the main winding of the motor and alternating current of the same phase is supplied to the starting winding of the motor, the motor rotor will rotate in a first direction. If the phase of the current supplied to the starting winding is reversed, the motor rotor will rotate in a second direction opposite to the first direction. After the starting winding is deenergized by the opening of the starting contact, the motor rotor continues to rotate in the direcion in which it was started so long as alternating current is supplied to the main winding of the motor. Therefore, if it is desired to reverse the direction of rotation of the rotor of motor M employed in my invention, it is necessary to interrupt the supply of current to the main winding MNW of the motor and to insure that such current is not again supplied to such winding until it is checked that the starting winding STW of the motor is energized, that is, starting contact STC has closed thereby checking that the starting winding may be energized to cause reversal of the motor rotor.

Relay SC is employed for checking that the starting contact STC of motor M is closed before alternating current is supplied to the main winding MNW of the motor. Since relay SC is a direct current relay, a half wave rectifier RE is connected across the winding of the relay to shunt away from the winding half waves of alternating current. In this manner relay SC is energized by direct current while alternating current is permitted to flow through capacitor CAP and starting winding STW of motor M. A resistor RS is inserted in the circuit to the control winding of relay SC to limit the flow of current through the winding of relay SC and rectifier RE. I will first describe in detail the energizing circuits for the main winding MNW of motor M, and for relay SC and the starting winding STW of motor M; and will then discuss an example of the reversal of the motor rotor in order that the operation and function of relay SC will be more readily understood.

The main winding MNW of motor M has an energizing circuit extending from terminal BX of the alternating current source over front contact *e* of relay MR and through winding MNW to terminal CX of the alternating current source. Thus the main or running winding of motor M is energized whenever relay MR is picked up.

The starting winding STW of motor M (and the control winding of relay SC) has a first energizing circuit extending from terminal BX of the alternating current source over front contact *b* of relay MOR, resistor RS, rectifier RE in its low resistance direction in multiple with the windinng of relay SC, the back point of contact *d* of relay MR, capacitor CAP, motor starting contact STC, motor starting winding STW, and over front contact *c* of relay MOR to terminal CX of the alternating current source. Winding STW (and relay SC) has a second energizing circuit extending from terminal BX of the alternating current source over front conact *b* of relay MCR, winding STW, starting contact STC, capacitor CAP, the back point of contact *d* of relay MR, rectifier RE in multiple with the winding of relay SC, resistor RS, and over front contact *c* of relay MCR to terminal CX of the alternating current source. Thus, winding STW of motor M is supplied with alternating current of first and second opposite phases when relays MCR and MOR, respectively, are picked up and contact STC is closed. This alternating current is also supplied to the winding of relay SC so long as relay MR remains released, and relay SC becomes picked up by the half waves of such current that are not shunted around the winding of relay SC by rectifier RE. When relay MR becomes picked up, as hereinafter described, the circuit including rectifier RE, the winding of relay SC and resistor RS is opened and these devices are by-passed by a circuit over the front point of contact *d* of relay MR. Relay SC then releases but winding STW remains enerized until starting contact STC opens.

Assuming that the rotor of motor M is rotating in a first direction, due to relay MCR having become picked up and supplying alternating current of the first relative phase to starting winding STW of the motor, it will be further assumed that relay MR has just released and it is desired to reverse the direction of the motor rotor. It is to be noted that front contact a of relay SC in the pickup circuit for relay MR prevents the pickup of relay MR until relay SC becomes picked up. I will now assume that relay MOR becomes picked up (in a manner to be hereinafter described) to supply alternating current of the second relative phase to winding STW. However, the rotor of motor M may be still rotating in its first direction at a sufficient speed that starting contact STC is still open. If, therefore, relay MR were permitted to be picked up at this time, the energizing circuit for the main winding MNW of the motor would again be closed and the motor rotor would continue to rotate in its first direction, since contact STC would not then close to energize the starting winding with alternating current of said second relative phase. When the rotation of the motor rotor has slowed sufficiently, contact STC closes and alternating current of said second relative phase is supplied to the starting winding of the motor and the winding of relay SC. The winding of relay SC is energized by the half waves of alternating current not shunted away from the winding by rectified RE and relay SC becomes picked up. This permits relay MR to become picked up and again supply alternating current to the main winding of the motor. However, it is now insured that the starting winding of the motor is energized, and alternating current of the second relative phase supplied to the starting winding causes reversal of the motor rotor. The picking up of relay MR transfers the energizing circuit for winding STW from the back point to the front point of contact d of relay MR and relay SC releases. Thus, it may be said that relay SC checks the closing of starting contact STC to insure the energization of starting winding STW of motor M before the energization of the main winding MNW of the motor. Thus, reversal of the motor rotor is insured when a quick reversal is to be made, that is, when the rotor of the motor is still rotating at a relatively high speed in its original direction (starting contact STC not yet closed).

Having thus described the apparatus of my invention in detail, I will now describe several operational examples of the overall system of my invention.

The apparatus is shown in FIG. 2 in its unactuated condition, that is, its condition prior to the initiation of an actuation thereof. When the driver of a vehicle operates the gate opening controller by the insertion of a key or coin into receptacle KR (FIG. 1) contact OC (FIG. 2) is momentarily closed and completes the pickup circuit for relay OR. Relay OR becomes picked up closing its stick circuit including back contact d of relay CR. The picking up of relay OR closes the pickup circuit for relay MOR which becomes picked up closing its stick circuit. Back contacts c of relays SC and MR in the pickup circuit for relay MOR insure, before relay MOR becomes picked up, that relays SC and MR have both released following any previous actuation thereof. The picking up of relay MOR closes the energizing circuit for relay SC and the starting winding STW of motor M. Relay SC becomes picked up and completes the pickup circuit for relay MR including the front point of contact e of relay MOR. Relay MR becomes picked up and transfers the energizing circuit for winding STW from the back point to the front point of contact d of relay MR. Relay SC releases. Relay MR is provided with a slow release feature to insure the completion of its stick circuit over its own front contact a when relay SC is released upon the opening of the back point of contact d of relay MR. The picking up of relay MR also closes the energizing circuit for the main winding MNW of motor M and the rotor of the motor is driven in a direction to raise or open gate G.

When gate G passes its 88-degree position that is, 2 degrees from its full horizontal position, to use the example previously discussed, contact CLS is actuated to its closed position and maintains that position until the gate again reaches its 88-degree position in its movement to its 90-degree traffic obstructing horizontal position. When the gate in its movement to its 0-degree position passes its 2-degree position, that is, 2 degrees from its full vertical or 0-degree position, contact OLS is actuated to its open position and maintains that position until the gate passes the 2-degree position in its movement to its 90-degree position. The opening of contact OLS when the gate passes its 2-degree position interrupts the stick circuits for relays MR and MOR, and those relays release. The release of relay MR opens the energizing circuit for the main winding MNW of motor M. The inertia of the rotor of motor M, and gate G and its drive arrangement, carries the gate to its full vertical or 0-degree position, however. The release of relay MOR opens, at front contacts b and c of that relay, the energizing circuit to the starting winding STW of motor M. It is to be noted that relay OR is maintained energized at this time in order to again apply power to raise the gate in the event the gate drifts towards its horizontal position or, for malicious or other reasons, is manually forced towards its horizontal position. Under such circumstances, when the gate passes its 2-degree position, the circuits will be actuated as just described and power will again be supplied to raise the gate. Under ordinary conditions, the inertia of the motor rotor and the reduction gear drive arrangement for the gate will be sufficient to maintain the gate in its full vertical or 0-degree position.

Assuming that the driver of the vehicle now moves the vehicle past the gate, treadle CT (FIG. 1) is depressed by the front wheels of the vehicle and contact CC (FIG. 2) is actuated to its closed position. The closing of contact CC completes the energizing circuit, including contact CLS, for relay CR and that relay becomes momentarily picked up. The closing of the front point of contact a of relay CR closes the pickup circuit for relay R1 which then becomes picked up closing its stick circuit. The picking up of relay R1 prepares the pickup circuit for relay R2 and, when relay CR releases, the front wheels of the vehicle having moved off of treadle CT, relay R2 becomes picked up completing its stick circuit including back contact d of relay OR which was deenergized by the opening of back contact d of relay CR. The pickup circuit for relay R1 is now open at back contact b of relay R2 but relay R1 is maintained energized by its stick circuit including the back point of contact a of relay CR. It is readily apparent that relay R2 cannot become picked up, thereby interrupting the pickup circuit for relay R1, until relay CR releases. When relay CR releases, completing the pickup circuit for relay R2, the stick circuit for relay R1 is also completed and the opening of back contact b of relay R2 in the pickup circuit for relay R1 is, therefore, immaterial at this time.

When the rear end of the vehicle has cleared the gate, the rear wheels actuate treadle CT (FIG. 1) and contact CC (FIG. 2) is again closed and relay CR again picked up. When relay CR becomes picked up upon this second actuation of contact CC the stick circuit for relay R1 is interrupted and, the pickup circuit for relay R1 being open at back contact b of relay R2, relay R1 releases following the expiration of its slow release period. Relay CR is made sufficiently slow to release that the back point of its contact a will remain open long enough to cause relay R1 to release. The release of relay R1 will prepare the pickup circuit for relay MCR and, when relay CR subsequently releases, this pickup circuit will be completed. Relay MCR accordingly becomes picked up. Back contacts b of relays SC and MR in the pickup circuit for relay MCR check that relays SC and MR released following the previous energization thereof.

The picking up of relay MCR closes the energizing circuit for the starting winding STW of motor M and the pickup circuit for relay SC. However, the alternating current supplied to winding STW at this time is of the opposite relative phase to that supplied to that winding when the gate was controlled to its open position. Relay SC becomes picked up completing the pickup circuit for relay MR, relay MR becomes picked up and the main winding of motor M is again energized. The current supplied to motor M at this time rotates the rotor of the motor in a direction to drive gate G towards its horizontal traffic obstructing position. As the gate passes its 2-degree position in its closing movement, contact OLS is again actuated to its closed position and, when the gate passes its 88-degree position, contact CLS is again actuated to its open position. The opening of contact CLS at this time interrupts the stick circuits for relays R2, MR and MCR and these relays release. The release of relay MR opens the energizing circuit for the main winding MNW of motor M. The inertia of the rotor of motor M, and gate G and its drive arrangement carries the gate to its full horizontal or 90-degree position, however.

It is to be noted that if the vehicle driver, in the description above, moves the vehicle past the gate and actuates closing treadle CT before the gate reaches its full nonobstructing position, as may readily occur when the vehicle is one of the small type of modern cars, back contact $d$ of relay CR will open the stick circuit for relay OR which will subsequently release, in turn, releasing relay MOR. The circuit for energizing motor M will then be interrupted at the open front contacts $b$ and $c$ of relay MOR and the gate will stop, possibly without reaching its full nonobstructing position. However, the gate will be controlled to its obstructing position, in the manner described above, when treadle CT is actuated by the rear wheels of the vehicle. Such operation prevents, insofar as possible, a second closely following vehicle from passing the gate unauthorizedly.

I will now assume that, following the first actuation and previous to the second actuation of treadle CT by the vehicle in the example described above, the driver of a second vehicle closely following the first actuates opening controller contact OC. Relay OR is again energized at this time and is now maintained energized by its stick circuit including front contact $d$ of relay R2 as well as back contact $d$ of contact CR. It is thus apparent that upon the opening of back contact $d$ of relay CR, when the rear wheels of the first vehicle actuate contact CC, relay OR will not be released. Relay R2 is now maintained picked up over its stick circuit including front contact $c$ of relay R1 and its pickup circuit including the back point of contact $b$ of relay CR. Now when relay CR becomes picked up upon the rear wheels of the first vehicle actuating contact CC, relay R1 will be released as previously, and the stick circuit for relay R2, including front contact $c$ of relay R1, will be interrupted. The pickup circuit for relay R2 will be open at front contact $b$ of relay R1 as well as the back point of contact $b$ of relay CR. However, the stick circuit over the front point of contact $b$ of relay CR will maintain relay R2 picked up so long as relay CR remains picked up. This insures that the pickup circuit for relay R1 is not completed by the closing of back contact $b$ of relay R2 while relay CR is picked up.

When relay CR subsequently releases the remaining stick circuit for relay R2 is interrupted and relay R2 releases following the expiration of its slow release period. Relay OR is now maintained picked up over its stick circuit including back contact $d$ of relay CR. It is to be noted that the pickup circuit for relay MCR could not be closed because of the open back contact $c$ of relay OR in such circuit. The slow release features of relays R1, R2, CR and OR insure at this time the correct sequence of operation of these relays. The apparatus is now in the condition existing subsequent to the actuation of gate opening controller contact OC by the driver of the first vehicle and prior to the first actuation of treadle contact CC by such vehicle. In other words the condition of the apparatus is as if no gate closing control had been actuated by the first vehicle. Thereafter, the apparatus will be actuated by the front and rear wheels of the second vehicle, in a manner identical to that previously described for the first vehicle, to control the gate to its traffic obstructing position.

It will now be assumed that the rear wheels of the first vehicle complete the gate closing control prior to the actuation of contact OC by the driver of the second vehicle, but that contact OC is again actuated while the gate is in transit to its closed position. It will be remembered that while the gate is so in transit relays R2, MCR and MR are all maintained energized until contact CLS opens. However, upon actuation of contact OC by the driver of the second vehicle, relay OR is picked up and is thereafter maintained picked up over its stick circuits including back contact $d$ of relay CR and front contact $d$ of relay R2. The picking up of relay OR interrupts the stick circuit for relay R2, and that relay releases following its slow release period. The release of relay R2 opens one of the stick circuits for relay OR but relay OR is maintained picked up over its other stick circuit including back contact $d$ of relay CR.

The picking up of relay OR, as described above, also opens the pickup and stick circuits for relay MCR and that relay releases. The release of relay MCR in turn releases relay MR. The pickup and stick circuits for relay MCR are also now open at front contact $c$ of relay R2. The release of relays MCR and MR opens the energizing circuits to the windings of motor M and the driving of the gate to its closed position by the motor rotor is interrupted. The closing of front contact $b$ of relay OR and back contacts $d$ and $c$ of relays MCR and MR, respectively, closes the pickup circuit for relay MOR and that relay picks up.

When the rotation of the rotor of motor M has slowed sufficiently, starting contact STC of the motor closes and relay SC becomes picked up. The picking up of relay SC completes the pickup circuit for relay MR and that relay becomes picked up. The starting winding STW of motor M is now energized with the phase of current relative to that supplied to the main winding MNW of the motor that the rotor of the motor is driven in the direction opposite to its previous direction and a control for the movement of the gate to its open position is again completed. Thereafter, the apparatus operates for the second vehicle in the manner previously described for the first vehicle in the completion of its gate opening and closing controls and no detailed description of such operation for the second vehicle is necessary.

From the foregoing description it is apparent that, with the apparatus of my invention as shown in the drawings of this application, I have provided a barrier control system for governing movements of individual vehicles through a passageway in a prescribed direction, the barrier being controlled to a traffic obstructing position following the passage of each individual vehicle providing that a closely following vehicle or the driver of such vehicle does not establish a control for controlling the barrier to its nonobstructing traffic position. The system also provides the minimum possibility of damage by the barrier to each closely following vehicle which establishes a control for opening of the barrier.

While I have shown and described only one form of apparatus embodying my invention, it should be understood that various changes and modifications may be made therein within the scope of the appended claims without departing from the spirit and scope of my invention.

Having thus described my invention what I claim is:

1. A system for controlling a barrier actuable between obstructing and nonobstructing positions in a passageway comprising, a first actuable control device on a first side of said barrier, a second actuable control device on the opposite side of said barrier; means controlled by the actuation of said first device for controlling said barrier to its nonobstructing position regardless of the position, other than the nonobstructing position, that the barrier occupies when the first device is actuated; and means controlled by two actuations of said second device for controlling said barrier to its obstructing position, providing the first device remains unactuated between the first and said two actuations of the second device and the movement of the barrier to its obstructing position.

2. A system for controlling a barrier actuable between obstructing and nonobstructing positions in a passageway comprising, an electric motor for moving said barrier between said positions, first and second circuit controlling devices on first and second sides respectively of said barrier, means controlled by the first device when twice actuated for closing a first energizing circuit to said motor to move said barrier to its obstructing position; and means controlled by the second device when actuated for closing a second energizing circuit to said motor to move said barrier to its nonobstructing position, and for interrupting said first energizing circuit to said motor providing the first energizing circuit is closed at the time of the actuation of the second device.

3. A system for actuating a barrier between obstructing and nonobstructing positions in a passageway comprising, an electric motor for moving said barrier between said positions, first and second circuit controlling devices, means controlled by a first actuation of said first device for preparing a circuit for energizing said motor to move the barrier to its obstructing position and for completing said circuit following a second actuation of that device; and means controlled by an actuation of the second device for closing a circuit for energizing said motor to move the barrier to its nonobstructing position, and for interrupting the first-mentioned circuit providing that circuit is prepared or completed at the time of actuation of the second device.

4. A system for controlling a barrier in a passageway for four-wheeled vehicles; first and second actuable control devices on first and second sides respectively of said barrier, said second device comprising a wheel actuated treadle; means controlled by said first device in response to an actuation thereof for controlling said barrier to a nonobstructing traffic position regardless of the position, other than such nonobstructing position, that the barrier occupies at the time of actuation of the first device; means controlled by said second device, in response to a first of two actuations thereof for interrupting control of said barrier to its nonobstructing position; and means controlled by said second device, in response to the second of said two actuations, for controlling said barrier to a traffic obstructing position, providing at the time of said two actuations that the barrier occupies a position other than said obstructing position and said first device remains unactuated following the first of said two actuations of the second device and until the time the barrier occupies the obstructing position.

5. In combination, a barrier operable between obstructing and nonobstructing positions, first and second operable control devices, means controlled by a single operation of said first device for controlling the barrier to its nonobstructing position when the barrier is in any other position, means controlled by a first of two successive operations of said second device for interrupting the control of said barrier to its nonobstructing position; and means controlled by the second of said two operations for controlling the barrier to its obstructing position when the barrier occupies any other position, providing said first device remains unoperated following the first of said two operations of the second device and until the barrier reaches said obstructing position.

6. In combination with a roadway over which four-wheeled vehicles move in a single lane in a single direction, a barrier for said roadway movable between traffic obstructing and nonobstructing positions, an electric motor connected to said barrier for moving the barrier from its obstructing position to its nonobstructing position and from its nonobstructing position to its obstructing position according as the motor is energized by current of first and second relative phases respectively, a first circuit controller on the near side of said barrier, relay means controlled by said circuit controller when operated for supplying current of said first relative phase to said motor; a treadle in the roadway on the far side of said barrier, a second circuit controller actuable by the depression of said treadle, means controlled by said second circuit controller in response to a first of two successive depressions of said treadle for interrupting the supply of current of said first relative phase to said motor, means controlled by said second circuit controller in response to the second of said two successive depression of said treadle for supplying of said second relative phase to said motor; and means controlled by said relay means, when operated to supply current of said first phase to said motor, for interrupting the supply of current of said second phase to the motor.

7. In combination, first and second controllers for a single lane passageway through which vehicles having only front and rear wheels move in a direction from the first controller towards the second controller, a traffic controlling barrier between said controllers and operable between obstructing and nonobstructing positions, means controlled by a single actuation of said first controller for operating said barirer to its nonobstructing position when the barrier occupies any position other than its nonobstructing position; and means controlled by two actuations of said second controller for operating said barrier to its obstructing position when the barrier occupies any position other than its obstructing position, providing that an actuation of said first controller does not intervene between the first actuation of the second controller and the movement of the barrier to its obstructing position.

8. In combination with a traffic barrier operable from a traffic obstructing position to a nonobstructing position in response to the actuation of a key or coin actuated controller, the system comprising, a treadle beyond said barrier and arranged to be operated first and second successive times by a front wheel and a rear wheel respectively of a vehicle passing said barrier and having front and rear wheels only; and means responsive to two successive operations of said treadle for controlling said barrier from its nonobstructing to its obstructing position, providing said controller remains unactuated following a first operation of said treadle and until the barrier attains its obstructing position.

9. In combination with a single lane passageway through which vehicles move in a single direction, the system comprising, a barrier for said passageway, reversible power means connected to said barrier for moving the barrier between obstructing and nonobstructing positions in said passageway according as said means is actuated in a first manner or a second manner, a controller on the near side of said barrier, means controlled by said controller for activating said power means in said first manner to move said barrier to its nonobstructing position when the controller is operated and the barrier is at the time of such operation in other than its nonobstructing position, means on the far side of said barrier for determining when the rear wheels of a vehicle have passed beyond the barrier a predetermined distance, a second controller, means controlled by the last mentioned means for actuating said second controller when a determination of a passage of the rear wheels of a vehicle said predetermined distance beyond the barrier has been made, means controlled by said second controller for activating said power means in said second manner to move said barrier to its obstructing position when that controller is operated and the barrier is at the time of such operation in other than its obstructing position, and means controlled by the first mentioned controlled for interrupting the activation of said power means in said second manner when that controller is operated during the time such activation of the power means is in the process of being effected or is in effect.

References Cited in the file of this patent

UNITED STATES PATENTS

| | | |
|---|---|---|
| 2,528,790 | Sherer | Nov. 7, 1950 |
| 2,735,202 | King | Feb. 21, 1956 |
| 2,795,875 | Nutter et al. | June 18, 1957 |
| 2,842,876 | Chicoine et al. | July 15, 1958 |
| 2,874,819 | Nutter | Feb. 24, 1959 |
| 2,906,505 | Orr et al. | Sept. 29, 1959 |
| 3,063,179 | Auer | Nov. 13, 1962 |

UNITED STATES PATENT OFFICE
CERTIFICATE OF CORRECTION

Patent No. 3,150,454

September 29, 1964

Crawford E. Staples

It is hereby certified that error appears in the above numbered patent requiring correction and that the said Letters Patent should read as corrected below.

Column 11, line 11, for "and" read -- of --; column 12, lines 20 and 21, for "depression" read -- depressions --; line 21, after "supplying" insert -- current --; column 13, line 5, for "controlled", second occurrence, read -- controller --.

Signed and sealed this 12th day of January 1965.

(SEAL)
Attest:

ERNEST W. SWIDER
Attesting Officer

EDWARD J. BRENNER
Commissioner of Patents